July 15, 1969　　HIDESATO SAKAMOTO　　3,455,542
HEATING FURNACE WITH A ROTARY HEARTH
Filed Oct. 30, 1967　　　　　　　　　　　　7 Sheets-Sheet 1

Inventor
Hidesato Sakamoto

July 15, 1969  HIDESATO SAKAMOTO  3,455,542
HEATING FURNACE WITH A ROTARY HEARTH
Filed Oct. 30, 1967  7 Sheets-Sheet 5

Inventor
Hidesato Sakamoto

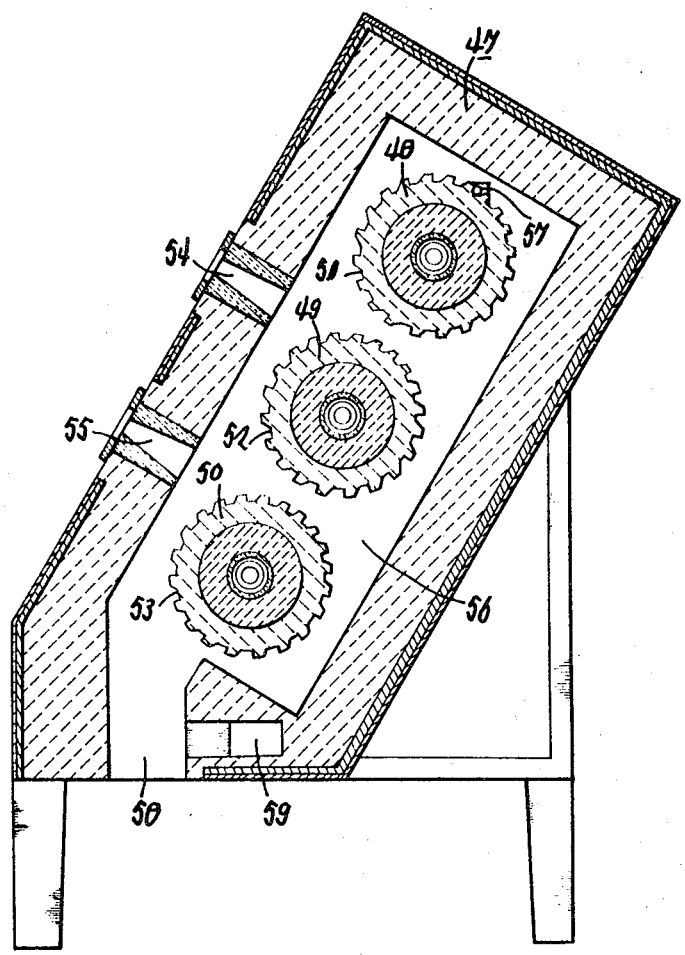

United States Patent Office 3,455,542
Patented July 15, 1969

3,455,542
HEATING FURNACE WITH A ROTARY HEARTH
Hidesato Sakamoto, 45–104 Hanahata Danchi,
Hanahara-cho, Adachi-ku, Tokyo, Japan
Filed Oct. 30, 1967, Ser. No. 678,970
Int. Cl. F27b 9/16, 3/12
U.S. Cl. 263—7           6 Claims

ABSTRACT OF THE DISCLOSURE

This invention relates to a heating furnace for heating malleable metallic materials as well as for other applications, and more particularly to a heating furnace having a rotary hearth provided with a suitable number of groovelike slots on the ends or circumferential surface thereof. The material to be heated is loaded successively into the slots and delivered in the direction of rotation until it drops of itself from the rotary hearth. During this process, the material accommodated in the slots is effectively heated by means of a high-temperature gas which flows within the furnace in a circular movement so as to encompass the rotary hearth.

Background of the invention

It is well known in the art that malleable metallic materials must be heated at a suitable forging temperature if they are to be mechanically forged into the desired shape. Since the quality and efficiency of forging is largely determined by heating, it will be appreciated that thorough attention should be given to the characteristics of heating furnaces for forging. The same, of course, applies to heating furnaces for quenching, annealing or heat-treating malleable metallic materials. Easy loading and extraction of the materials to be heated, adjustability of heating temperature for uniform heating, minimum oxidation of the material, and heating economy, then, may be cited as general requirements for heating furnaces in this category.

Conventional heating furnaces may be classified, by fuel, into solid fuel furnaces, gas furnaces, liquid fuel furnaces and electric furnaces; and, by type, into box type furnaces and continuous furnaces. While box type furnaces, or so-called batch furnaces, rank first in terms of demand, they are far from efficient as the material to be heated must be loaded separately. In contrast, continuous loading is possible with push-in furnaces, where the material is fed into a linear hearth by means of a charger. But since continuous loading calls for a considerably long hearth, the flow of high-temperature gas within the furnace tends to become linear, thereby reducing thermal efficiency and increasing heating expenses. Moreover, since the material and high-temperature gas travel in opposite directions, the material is exposed to the flames of the burner upon reaching a high temperature, and this tends to increase oxidation of the material.

Summary of the invention

As object of this invention is to provide a heating furnace provided with a rotary hearth having a horizontal or oblique axis and a suitable number of groovelike slots on the ends or circumferential surface thereof, and adapted to deliver the material to be heated, which is loaded successively into the slots, in the direction of rotation until it drops of itself from the rotary hearth.

Another object of this invention is to provide a heating furnace where combustion gas issuing from the burner and flowing toward the interior of the furnace encompasses the rotary hearth in a circular movement so as to apply heat uniformly and effectively to the material accommodated in the slots.

It is widely known that a point located on a cylindrical body having a horizontal or oblique axis traces a circle perpendicular or oblique to the horizontal plane when the cylindrical body is rotated. Assuming then that the point is a slot, and that the slot accommodates an object, the slot would obviously retain that object within a specific range of the circle it describes. In other words, an object fed into the slot at the starting point of that range would, of course, drop of itself from the slot as soon as the slot reaches the end of the range, and the angle of rotation of the cylindrical body during that process would be determined by the axial direction of the cylindrical body and the position and configuration of the slot formed thereon. However, should a large number of slots of identical configuration be formed on the curved surface of a single cylindrical body, the angle of rotation of the slots would obviously be identical.

The principle outlined above constitutes the very essence of the present invention. The fact that the furnace as defined by this invention is provided with a rotary hearth having a suitable number of groovelike slots on the ends or circumferential surface thereof implies that the material to be heated is loaded successively into the slots and transported through the furnace while being heated. Further, this indicates that measures for delivery and extraction of the material may be eliminated since the invention only calls for loading of the material into the slots, and that the material may be processed continuously and economically.

The furnace makes it possible to apply heat to the material while it is accommodated in the slots. The duration of accommodation of the material in the slots is equivalent to the time the material remains in the furnace and may be determined by the diameter of the rotary hearth, the angle of rotation of the rotary hearth relative to the period the material is retained in the slots, and the circumferential speed of the rotary hearth. In other words, the length of accommodation of the material in the furnace may be determined by the diameter, angle of rotation and circumferential speed of the rotary hearth, and optimum heating temperature may, of course, be determined accordingly. Since, however, the angle of rotation is determined by the axial direction of the rotary hearth as well as by the position and configuration of the slot or, in other words, by factors forming an integral part of the furnace, it is to be understood that adjustment at the time of operation would be difficult. This notwithstanding, a furnace with a satisfactory degree of efficiency and capable of retaining the material to be heated for a considerable length of time, that is, in relation to circumferential speed, may be built by maximizing the factors listed above. Circumferential speed may, of course, be easily changed by adjusting the driving mechanism of the rotary hearth. Obviously, the length of accommodation of the material in the furnace may be increased by decreasing circumferential speed, but substantial reduction of circumferential speed should be avoided since it adversely affects processing capacity. On the other hand, inordinately high circumferential speed not only reduces the length of accommodation of the material in the furnace but makes loading difficult. It is essential therefore that circumferential speed be determined with the utmost care.

As pointed out earlier, the axial direction of the rotary hearth may be either horizontal or oblique, in which case the angle of inclination may be freely determined. While the position of the slots may be restricted in certain measure depending on the axial direction of the rotary hearth, the slots may generally be formed on the ends or circumferential surface of the rotary hearth. More specifically, slots cannot be disposed on the end portions in the case of a horizontally oriented rotary hearth or on the lower end portion in the case of an obliquely oriented rotary hearth, since in such positions they would be incapable of accommodating the material to be heated.

With regard to the present invention, a heating furnace whose rotary hearth is horizontally oriented and provided on its circumferential surface with slots disposed parallel to its axis may be regarded as having the widest range of application. For this type of heating furnace, the angle of rotation of the rotary hearth may generally be set in excess of 120 degrees, though the configuration of the slots would have to be taken into consideration. In a preferred embodiment of the present invention, the heating furnace comprises a horizontal rotary hearth measuring 1000 mm. in diameter and provided on its circumferential surface with 30 slots disposed parallel to its axis. Each slot has a pitch of 104 mm. and defines a void in the shape of an inverted trapezoid. Operated at ⅕ r.p.m., the rotary hearth covers an effective angle of rotation of 134 degrees in 1 minute and 51 seconds.

It will be appreciated that by changing the axial direction of the rotary hearth or the position or configuration of the slots, a considerable number of changes, variations and modifications may be resorted to without departing from the spirit and scope of the present invention. For instance, as will be described more specifically with regard to other preferred embodiments of this invention, the slots may be arranged radially on the side of an obliquely oriented rotary hearth; or a plurality of rotary hearths may be disposed in multiple stages within the furnace so as to carry the material to be heated in a descending direction.

It is well known to those in the art that the rate of oxidation is substantially lower when the material to be heated is exposed to heat directly transmitted by the maximum temperature combustion flame during the initial stage of heating than it is when the material is exposed to the same in the final stage of heating. Accordingly, a major object of the present invention is to eliminate a defect common to push-in furnaces, namely, that the rate of oxidation tends to increase since the material is directly exposed to the flames in the later stages of heating. More specifically, combustion gas directed toward the internal void of the furnace is made to flow in a circular movement corresponding with the direction of rotation of the rotary hearth so as to encompass the rotary hearth. The combustion gas inlet is disposed at a point at least this side of the material loading inlet in relation to the direction of rotation so that the material is subjected to intense radial heat from the combustion flame immediately after loading. At the same time, it is exposed to conduction heat accumulated by the rotary hearth as well as radial heat from the furnace wall. It is essential that the material be heated satisfactory in the later stages of heating or the latter half of its passage through the furnace, that is, when it is at a substantial remove from the combustion flame and in a condition that does not readily allow of oxidation.

This invention provides a heating furnace which, after loading, delivers the material to be heated by means of and in the direction of rotation of a rotary hearth, in the desired span of time, until the material drops by its own weight out of the furnace. If greater efficiency is desired, manual operations—from loading to extraction—may be eliminated by mechanized loading. Needless to say, reduction of time and labor with regard to heating operations produces highly favorable results in terms of heating cost.

The advantages of eliminating linear induction of combustion gas, a factor common to push-in furnaces, are many in terms of structure and function and by no means confined to saving space. For instance, in the present invention the fact that the hearth is rotatable makes it possible to regulate the flow of combustion gas in such a way that it flows in the direction of rotation of the hearth, thus encompassing the hearth. This results in effective utilization of combustion gas and better thermal efficiency, and this in turn not only cuts heating cost but reduces heating time. Another advantage is that heating temperature may distributed in a satisfactory manner, thereby making it possible to apply heat to the material when it is least vulnerable to oxidation and decarburization. A still further feature of this heating furnace is that the small amount of oxides that does form is discharged from the furnace together with the heated material. In other words, oxides neither adhere to the rotary hearth nor remain in the furnace, and this, of course, facilitates maintenance. Again, the furnace can be moved easily and requires little space, since it is simple in structure and allows of substantially small outer dimensions.

Brief description of the drawings

In the drawings:
FIGURE 7 is a sectional view of still another embodiment of this invention comprising a plurality of rotary hearths disposed in multiple stages.

Description of the preferred embodiments

Preferred embodiments of the present invention will now be described in detail in conjunction with the accompanying drawings. In FIGURES 1 through 5 there is shown a heating furnace representative of present invention and comprising a horizontal rotary hearth provided with a plurality of slots on its circumferential surface. Modified versions of the present invention are shown in FIGURES 6 and 7.

Figure 1:
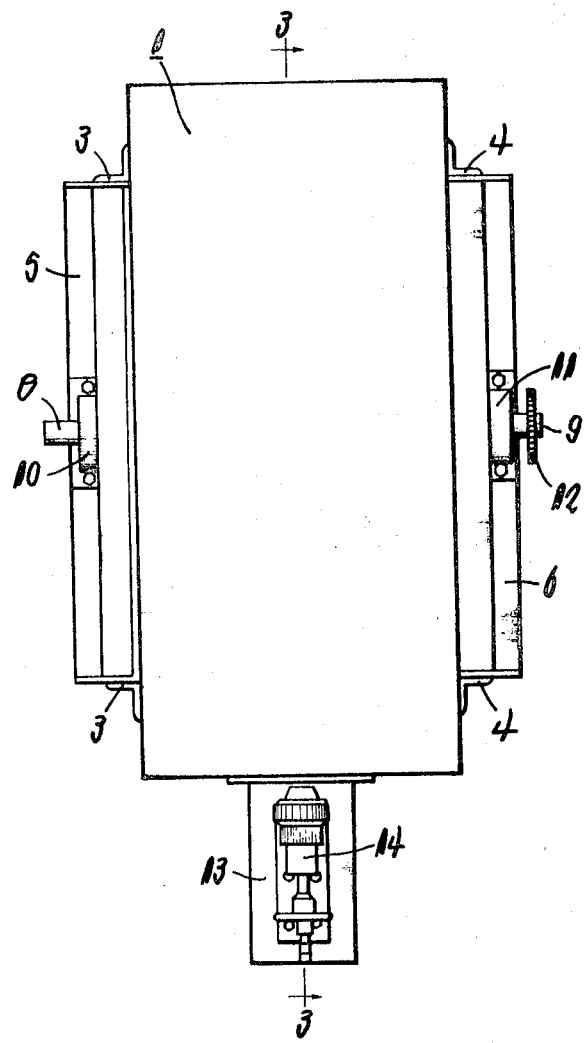
FIGURE 1 is a plan view of a heating furnace constructed according to this invention.
Figure 2:
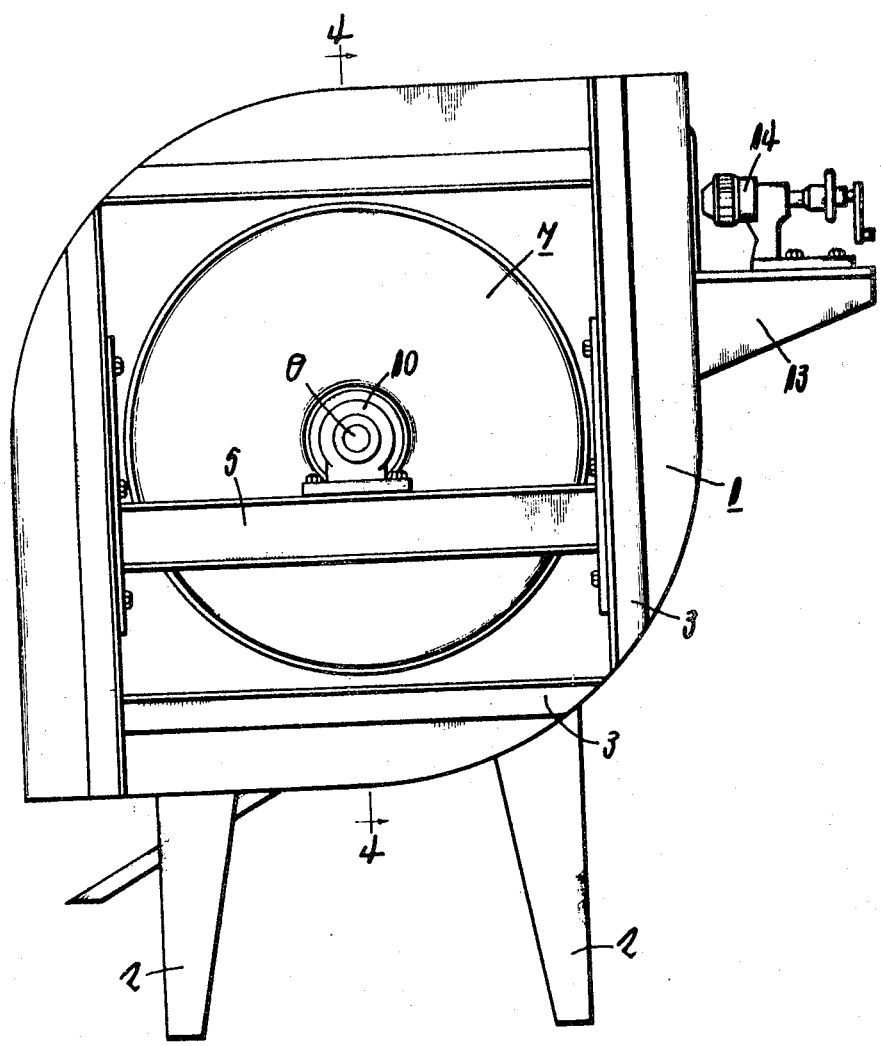
FIGURE 2 is a side view of the heating furnace shown in FIGURE 1.

FIGURES 1 and 2 provide an external view of the heating furnace which is generally designated by the reference numeral 1. The furnace body 1 consists of rectangular planes arranged in box form and is supported at a suitable height by four legs 4 attached to the bottom thereof. Further, the furnace body 1 is reinforced on both sides by means of reinforcing frames 3, 4 which are firmly maintained perpendicularly by means of steel angles. The vertical members of the reinforcing frames support between them considerably strong channel steel beams 5, 6 which extend horizontally from one vertical member to the other in corresponding positions on both sides of the furnace body 1.

The rotary hearth is disposed within the furnace body 1 but may generally be designated by the reference numeral 7 as the end portions thereof are exposed at both sides of the furnace. Two axial members 8, 9 are disposed horizontally and supported by bearings 10, 11 fixed to the beams 5, 6. The rotary hearth is coupled with a driving mechanism (not shown) by means of a sprocket wheel 12 disposed on the axial member 9. While a narrow void exists between the rotary hearth 7 and the furnace body 1, steps have been taken to prevent thermal loss, as will be discussed later in detail.

A burner 14 is installed on a base 13 protruding from the upper front portion of the furnace body 1. Conventional burners using liquid or gaseous fuel may be employed.

Figure 3:
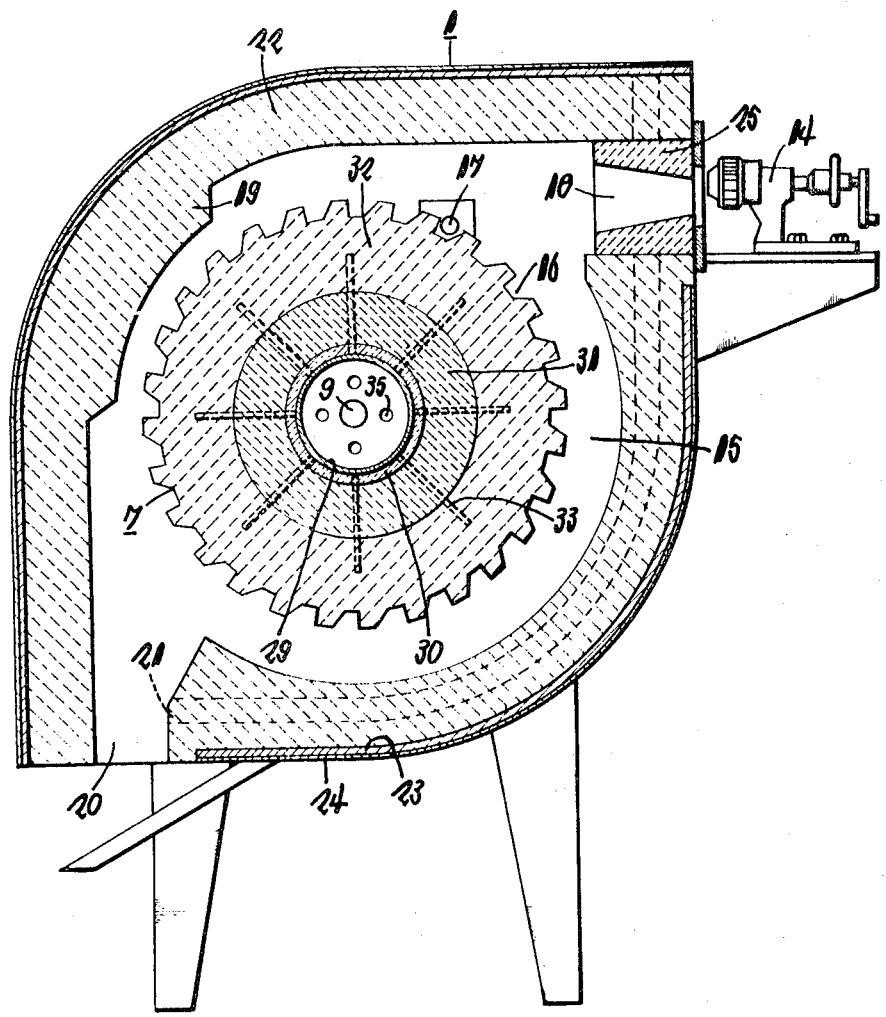
FIGURE 3 is a sectional view taken on the line 3—3 of FIGURE 1.

The features of this heating furnace are best shown in FIGURE 3. The rotary hearth 7 is centrally disposed in a generally circular space defined by the furnace wall and thereby forms an annular space 15 in relation to the furnace. The rotary hearth 7 rotates counterclockwise and is provided on its circumferential surface with a suitable number of horizontal groove-like slots 16 adapted to accommodate the material to be heated and whose section defines an inequilateral trapezoid. A loading inlet 17 is formed at the upper portion of one side of the furnace body 1 for successive loading of the material to be heated into the slots 16. Preferably, the loading inlet 17 should be aligned with the first point where the material can be loaded into the slots 16 without dropping. The material to be heated is inserted by way of the loading inlet 17 at a considerable speed and accommodated in the slots 16 disposed on the circumferential surface of the rotary hearth 7. While loading begins as soon as or immediately before one of the slots is aligned with the loading inlet 17, the slots should preferably be provided with a certain measure of idle space since the rotary hearth 7 revolves, though at an extremely low speed. Actually, loading operations may be performed by means of an automatic device (not shown) based on the principle of a lever crank mechanism.

A combustion inlet 18 for guiding combustion gas into the furnace space 15 opens at the upper front wall of the furnace body 1 in a horizontal direction tangential to the rotary hearth 7, a burner 14 being located to the outside of the combustion inlet. A crash wall 19 is formed opposite to the combustion inlet 18 on the upper rear wall of the furnace body 1 in order to direct combustion gas toward the material to be heated as well as to promote convection of the gas.

An outlet 20 for extracting the heated material is disposed at the rear bottom portion of the furnace body 1 and opens downwardly in a vertical direction tangential to the rotary hearth 7. Material loaded into the slots 16 for heating by way of the loading inlet 17 is delivered by the rotary hearth 7 in its direction of rotation and drops by its own weight from the slots at a point immediately above the outlet 20. The passage extending from the outlet 20 to the front furnace wall front and designated by the dotted lines 21 serves as a flue for waste gas.

The furnace body 1 comprises a castable refractory 22 of substantial thickness formed in a molding box, a heat insulator 23 such as, for example, rock wool, covering the refractory, and an iron plate 24 covering the heat insulator. A protective frame 25 composed of a special plastic refractory capable of withstanding radical changes in temperature is provided around the cumbustion inlet 18. (Reference will be made to the rotary hearth 7 after describing FIGURE 4.)

Figure 4:
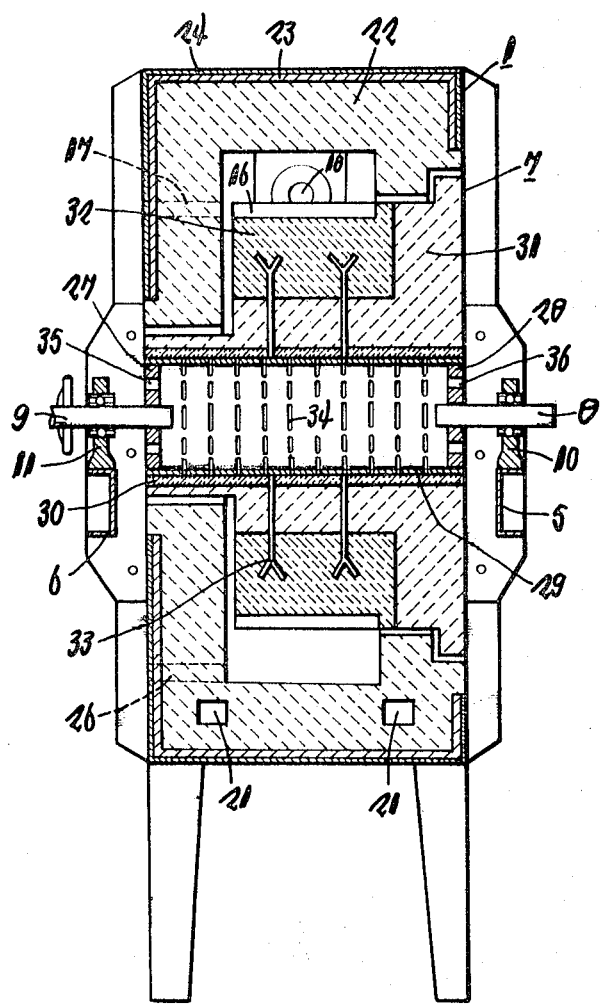
FIGURE 4 is a sectional view taken on the line 4—4 of FIGURE 2.

FIGURE 4 discloses in detail the rotary hearth 7 and the furnace body 1 as viewed in the axial direction. The peripheral portions of the circumferential surface of the rotary hearth 7 are respectively disposed higher and lower than the central portion thereof where the slots 16 are located so that the circumferential surface of the rotary hearth is graded into multiple stages, the multistage surface being closely hemmed in by the surface body 1 in order to prevent calorific loss.

The combustion inlet 18 being tangentially oriented with regard to the rotary hearth 7, as may be observed in FIGURE 4, it will be appreciated that combustion gas flows toward the center of the slots 16. It will also be seen that two flues 21 penetrate the bottom portion of the furnace wall. The dotted lines 26 extending from the lower portion of the furnace wall to communicate with the furnace space 15 represent an outlet for removing any oxides that may remain in the furnace.

As clearly observed from the drawings, including FIGURE 3, the rotary hearth 7 comprises a pair of axial members 8, 9, flanges 27, 28 attached thereto, a cylindrical shaft 29 resembling a steel tube and supported between the flanges, a heat insulator 30, such as, for example, rock wool, encompassing the cylindrical shaft, a castable refractory 31 disposed around the insulator and arranged in multiple stages in the axial direction, and a plastic refractory 32 arranged over and only within the range of the central portion of the axially oriented circumferential surface of the castable insulator. In order to firmly secure the plastic refractory 32 and the castable refractory 31 to the cylindrical shaft 29, a suitable number of anchors are disposed radially on the cylindrical shaft. A suitable number of grooves 34 are formed on the circumferential surface of the cylindrical shaft 29 with a view to preventing dimensional variations due to thermal expansion. In this connection, the flanges 27, 28 are provided with a suitable number of air holes 35, 36 for ventilating the interior of the cylindrical shaft 29.

It will therefore be appreciated that the location of the slots 16 disposed on the rotary hearth 7 is confined to the central portion of the axially oriented circumferential surface of the hearth or, in other words, to the circumferential surface of the plastic refractory 32 (see FIGURE 4). Referring to the slots, each slot has in the longitudinal direction an open end adapted to be aligned with the loading inlet 17 and closed and adapted to act as a stopper for the material to be heated. The layer of plastic refractory 32 comprising a suitable number of slots is actually formed by stamp forming conducted in such a manner that the plastic refractory 32 covers the castable refractory 31. This operation is by no means difficult as the plastic refractory 32 has an extremely high degree of moldability. Also, since the plastic refractory consists largely of aluminum oxide, it has excellent anti-abrasive and heat conduction properties and, as such, it not only withstands frequent loading without the slightest sign of damage but offers satisfactory results in terms of transmitting heat to the material. While the rotary hearth 7 is constantly exposed to direct heat during operation, there is no danger of abnormal accumulation of heat in one spot since the hearth undergoes rotation.

Figure 5:
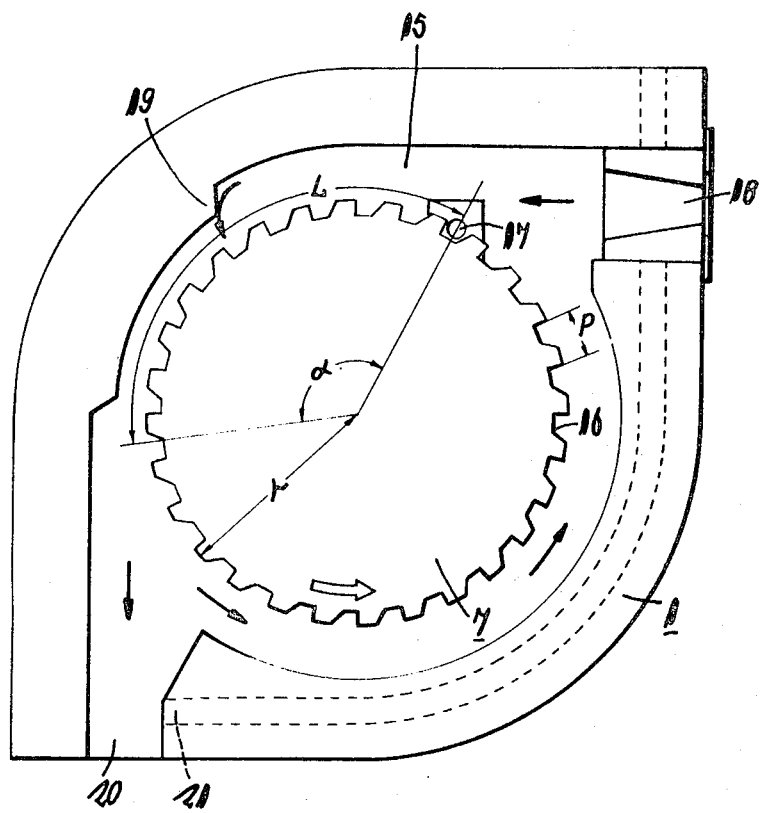
FIGURE 5 is an operational illustration of the heating furnace shown in FIGURES 1 through 4.
Figure 6:
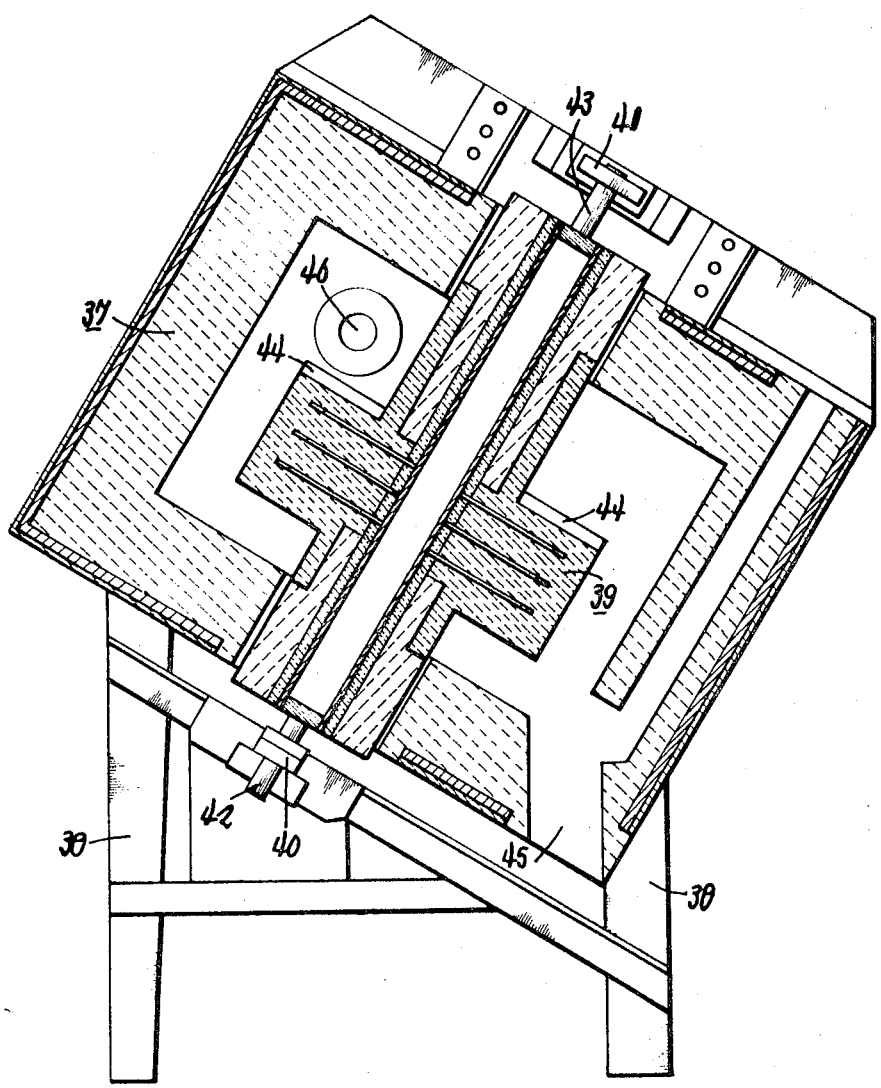
FIGURE 6 is a sectional view of another embodiment of this invention including a rotary hearth with an oblique axis.

The objects and features of the present invention described thus far will be better understood by referring to FIGURE 5, which illustrates the operational principles of the heating furnace. The rotary hearth 7 turns slowly in a counterclockwise direction as indicated by the arrows and delivers to the extraction outlet 20 the material to be heated, which is loaded into the slots 16 disposed on the circumferential surface of the hearth by way of the loading inlet 17. The material to be heated should, of course, be arranged beforehand so that it may be loaded successively into the slots. Accordingly, the time necessary for loading at the loading inlet 17 should be taken into consideration with the rate of rotation of the rotary hearth 7 when determining the pitch $p$ of the slots 16. The material to be heated covers in the furnace space 15 an effective distance $L$ extending from the loading inlet 17 to a point where the material drops by its own weight from the slots 16 into the extraction outlet 20. The effective distance L is determined by the radius r and the effective angle of rotation α of the rotary hearth 7. In the present embodiment of the invention, the position of the loading inlet 17 is fairly high since an oblique idle space is provided on one side of the inequilateral trapezoid defined sectionally by the slots 16 in order to facilitate loading. The effective angle of rotation α, however, is approximately 120 degrees. The interval of accommodation within the furnace of the material to be heated may easily be calculated from the rate of rotations and the effective angle of rotation α of the rotary hearth 7.

The burner flame, which is guided by way of the combustion inlet 18 into the furnace space 15 in the tangential direction of the rotary hearth 7, completes combustion and changes into high-temperature gas in the neighborhood of the crash wall 19, strikes against the crash wall and flows counterclockwise in close contact with the surface of the rotary hearth 7. While part of the high-temperature gas escapes from the furnace by way of the flue adjacent the extraction outlet 20, the rest of the gas circulates in the furnace space 15. Accordingly, even the portions of the rotary hearth 7 that do not accommodate the material to be heated are heated as a result of convection of the gas. In particular, the top layer of the rotary hearth 7, that is, the plastic refractory, effectively absorbs heat since it has excellent heat conducting and heat absorbing properties. Heat conducted by the rotary hearth 7, radial heat issuing from the burner flame and furnace wall, and convection in the furnace space 15 make for efficient heating of the material.

The work volume of this heating furnace can be determined by the radius r and the rate of rotation of the rotary hearth 7, the pitch p of the slots 16, and the effective distance L or effective angle of rotation in the furnace space 15.

Turning now to FIGURE 6, there is disclosed a sectional view of a heating furnace providing further advantages. A major feature of this system is that the furnace body 37 is supported obliquely by means of leg elements attached to the bottom thereof so that the rotary hearth 39 is disposed obliquely within the furnace body. Accordingly, the axial members 42, 43 of the rotary hearth 39 are supported by bearings 40, 41. A suitable number of slots generally designated by the reference numeral 44 are provided on the obliquely oriented upper lateral surface of the rotary hearth 39 in such a manner that they radiate toward the axis thereof, though this may not not be observable from the drawing because of diagrammatic limitations. The effective angle of rotation of the rotary hearth 39 may therefore be set at approximately 200 degrees. In this connection, the loading inlet, which in FIGURE 6 is concealed from view by the rotary hearth 39, is so disposed that is opens toward the slots 44 when the slots are parallel with the front wall of the furnace. The extraction outlet 45 is disposed somewhat to the rear at the bottom of the furnace body 37, and the combustion inlet 46 opens from the upper portion of the front furnace wall toward the rear of the furnace. The combustion inlet 46 should, of course, occupy position that permits the combustion gas to come into effective contact with the material to be heated. The advantages of this heating furnace are that the material to be heated may be retained in the furnace over a longer period since the effective angle of rotation is wider, and that heat conduction efficiency relative to the material to be heated may be enhanced since the extraction outlet 45 does not overly affect convection of the combustion gas within the furnace.

FIGURE 7 there is shown a sectional view of a heating furnace capable of providing similar advantages, though through different means. According to this system, the furnace body 47 is tall and obliquely oriented and comprises a plurality of rotary hearths, 48, 49, 50 arranged in multiple stages and provided on their circumferential surface with a suitable number of slots 51, 52, and 53 positioned in the manner illustrated in in FIGURES 1 through 4. Two matching combustion inlets 54, 55 adapted to guide the flames into the furnace space 56 are formed in the furnace wall. While the furnace space 56 is not annular, the combustion gas comes into effective contact with the material to be heated. A loading inlet 57 is formed in the furnace wall facing the slots 51 disposed on the uppermost rotary hearth 48, and an extraction outlet 58 is aligned at the bottom of the furnace body 47 with the vertical tangential direction of the lowermost rotary hearth 50. A flue 59 opens at a point adjacent then extraction outlet 58. The material to be heated is first loaded into the slots 51 disposed on the circumferential surface of the uppermost rotary hearth 48 subsequently drops in the vertical tangential direction of the rotary hearth into the slots 52 disposed on the circumferential surface of the middle rotary hearth 49. In like manner, the material drops into the slots 53 disposed on the circumferential surface of the lowermost rotary hearth 50 and finally drops out of the furnace by way of the extraction outlet 58. The flames guided into the furnace by the combustion inlets 54, 55 finish burning in the neighborhood of the circumferental surface of the middle rotary hearth 49 and the lowermost rotary hearth 50 and circulate in the furnace space 56 in the form of high-temperature gas. As is the case with the heating furnace illustrated in FIGURE 6, this heating furnace is capable of increasing the interval of accommodation in the furnace of the material to be heated and of improving contact between the material to be heated and combustion gas.

Having described in detail a number of embodiments of the present invention, it will now be apparent to those skilled in the art that numerous changes, variations and modifications are possible without departing from the spirit and scope of this invention. This is particularly true with regard to the position and configuration of the slots, since these factors are largely determined by the nature and heating temperature of the material to be treated. Also, loading methods allow of a wide range of variations. It is to be understood, therefore, that the embodiments described herein by no means exhaust the possibilities inherent in this invention.

What I claim is:

1. A heating furnace comprising relatively rotatable body and hearth portions and including heating means for heating a material, an inlet for said material to be heated and an outlet for heated material, one of said portions being provided with a plurality of recesses each of which extends a substantial extent along a surface of said one of said portions facing said heating means for receiving within the confines of said recesses a charge of material supplied from said inlet and for automatically conveying the charge to said outlet during said relative rotation, said recesses alone serving to hold the charge of material during its automatic conveyance to said outlet, said hearth portion being spaced at its outer surfaces from said body portion to define at least upper and lower space regions, said heating means being disposed to directly supply heat within one of said space regions and said outlet being disposed in communication with the other of said space regions in which the material solely under its own weight is automatically released from said recesses through said outlet.

2. A furnace according to claim 1, wherein said hearth portion is rotatable relative to said body portion and said heating means comprises a burner effective to supply a source of hot combustible gases.

3. A furnace according to claim 2, wherein said hearth portion is disposed within said body portion for rotation about a horizontal axis.

4. A furnace according to claim 3, wherein support means is provided for supporting said hearth and body portions with said horizontal axis angularly offset from a horizontal position.

5. A furnace according to claim 4, wherein said hearth portion comprises a plurality of rotary hearths disposed in said furance spaced from one another and distributed between said upper and lower space regions, one of the extreme hearths being disposed adjacent said inlet, the opposite extreme hearth being disposed adjacent said outlet.

6. A furnace according to claim 5, wherein said burner means comprises at least two burners disposed to direct a source of hot combustible gases toward the recesses formed in at least two of said plurality of hearths.

References Cited

UNITED STATES PATENTS 2,647,199   7/1953   Wharff _____ 263—7
2,820,621   1/1958   Hess _____ 263—7

FOREIGN PATENTS 613,632   5/1935   Germany.

JOHN J. CAMBY, Primary Examiner